(12) United States Patent
Yoon

(10) Patent No.: US 7,792,536 B2
(45) Date of Patent: Sep. 7, 2010

(54) APPARATUS AND METHOD FOR CANCELING INTERFERENCE IN WIRELESS MOBILE COMMUNICATION SYSTEM

(75) Inventor: Eun-Chul Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 11/983,105

(22) Filed: Nov. 7, 2007

(65) Prior Publication Data

US 2008/0108377 A1 May 8, 2008

(30) Foreign Application Priority Data

Nov. 7, 2006  (KR) ........................ 10-2006-0109695

(51) Int. Cl.
*H04B 15/00* (2006.01)

(52) U.S. Cl. ...................... 455/501; 455/63.1; 455/296; 455/295; 375/346; 375/148

(58) Field of Classification Search ................ 455/63.1, 455/67.11, 67.13, 10, 452.2, 464, 501, 504, 455/135, 150.1, 154.1, 431, 422.1, 295, 296, 455/562.1, 561, 550.1; 375/341, 346, 148, 375/296, 324, 329; 370/333, 329, 241, 465
See application file for complete search history.

(56) References Cited

U.S. PATENT DOCUMENTS

| | | | | |
|---|---|---|---|---|
| 2003/0081702 | A1* | 5/2003 | Kubo et al. | 375/341 |
| 2003/0195016 | A1* | 10/2003 | Periyalwar | 455/562.1 |
| 2006/0062336 | A1* | 3/2006 | Kang et al. | 375/346 |
| 2006/0120324 | A1* | 6/2006 | Cho et al. | 370/329 |
| 2006/0133543 | A1* | 6/2006 | Linsky et al. | 375/341 |
| 2007/0121766 | A1* | 5/2007 | He | 375/346 |
| 2008/0107085 | A1* | 5/2008 | Yoon | 370/333 |

FOREIGN PATENT DOCUMENTS

| | | | |
|---|---|---|---|
| KR | 1020010060018 A | 7/2001 |
| KR | 1020030023332 A | 3/2003 |
| KR | 1020080025490 A | 3/2008 |
| KR | 1020080049892 A | 6/2008 |

* cited by examiner

*Primary Examiner*—Tan Trinh

(57) ABSTRACT

Provided is an apparatus and method for canceling interference by a base station in a wireless mobile communication system. The method includes measuring a state of a channel with a mobile station, determining metric function values for channels that act as interference to the channel of the mobile station, selecting a predetermined number of interference channels in descending order of the metric function values, determining a weight vector for removing a signal transmitted over the interference channels, and applying the determined weight vector to a transmission signal and transmitting the weight vector applied signal.

15 Claims, 5 Drawing Sheets

APPARATUS AND METHOD FOR CANCELING INTERFERENCE IN WIRELESS MOBILE COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Nov. 7, 2006 and assigned Serial No. 2006-109695, the entire disclosure of which is hereby incorporated by reference.

TECHNICAL FIELD OF THE INVENTION

The present invention relates to an apparatus and method for canceling interference in a wireless mobile communication system, and in particular, to an apparatus and method for selecting a mobile station to be interference-canceled in a wireless mobile communication system.

BACKGROUND OF THE INVENTION

Communication using multiple antennas is an efficient method for performing high-speed data transmission and for increasing the capacity of a communication system. However, it is not easy to apply multiple antennas to a mobile station because of hardware space restrictions. As a result, base station typically uses multiple antennas and a mobile station employs beamforming (BF) using a single antenna.

FIG. 1 illustrates conventional downlink beamforming (DL-BF) that does not consider interference cancellation.

Referring to FIG. 1, base stations 101, 102 and 103 transmit a signal using maximum power while considering only mobile stations 110, 120, and 130 located in sectors of the base stations 101-103, respectively. In other words, each of the base stations 101-103 does not consider an interference signal introduced to its neighboring sector. While such a signal transmission method is the best scheme for a single-cell structure, it may degrade the overall system performance in a multi-cell environment due to interference between cells or sectors.

To solve the problem, a downlink beamforming (DL-BF) method in which an uplink (UL) weight vector is also applied to a downlink (DL) operation may be used. The DL-BF method can be implemented on the assumption that an UL channel state and a DL channel state are similar to each other.

When a beam pattern used in an UL is applied to a DL, performance degradation does not occur if a reception signal and an interference signal are received at different angles in space. This is the case with signal transmission. However, in an actual channel environment, the reception signal and the interference signal are not likely to be separated completely in space. Moreover, since the link characteristics of the DL and the UL (e.g., noise variances) are different from each other, the use of an uplink beamforming (UL-BF) weight vector for a DL-BF weight vector degrades system performance. Therefore, there is a need for a new interference cancellation method capable of using a DL-BF weight vector.

SUMMARY OF THE INVENTION

To address the above-discussed deficiencies of the prior art, it is a primary object of the present invention to address at least the above problems and/or disadvantages and to provide at least the advantages described below. Accordingly, an aspect of the present invention is to provide a method and apparatus for selecting a mobile station to be interference-canceled in a wireless mobile communication system.

According to one aspect of the present invention, there is provided a method for canceling interference by a base station in a wireless mobile communication system. The method includes measuring a state of a channel with a mobile station, determining metric function values for interference channels that act as interference to the channel of the mobile station, selecting a predetermined number of interference channels in descending order of the metric function values, determining a weight vector for removing a signal transmitted over the interference channels, and applying the determined weight vector to a transmission signal and transmitting the weight vector applied signal.

According to another aspect of the present invention, there is provided an apparatus for selecting interference channels for a base station in a wireless mobile communication system. The apparatus includes a threshold comparator for comparing an interference channel estimation value determined using information about a state of a channel with a mobile station with a preset threshold, a metric calculator for determining metric function values for interference channels, and a sorter for sorting the interference channels in descending order of the metric function values calculated by the metric calculator and then selecting a predetermined number of interference channels.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present invention provides an apparatus and method for canceling interference affecting a mobile station located in another sector or cell in a wireless mobile communication system. The present invention can be applied to a system using downlink beamforming (DL-BF).

Figure 1:
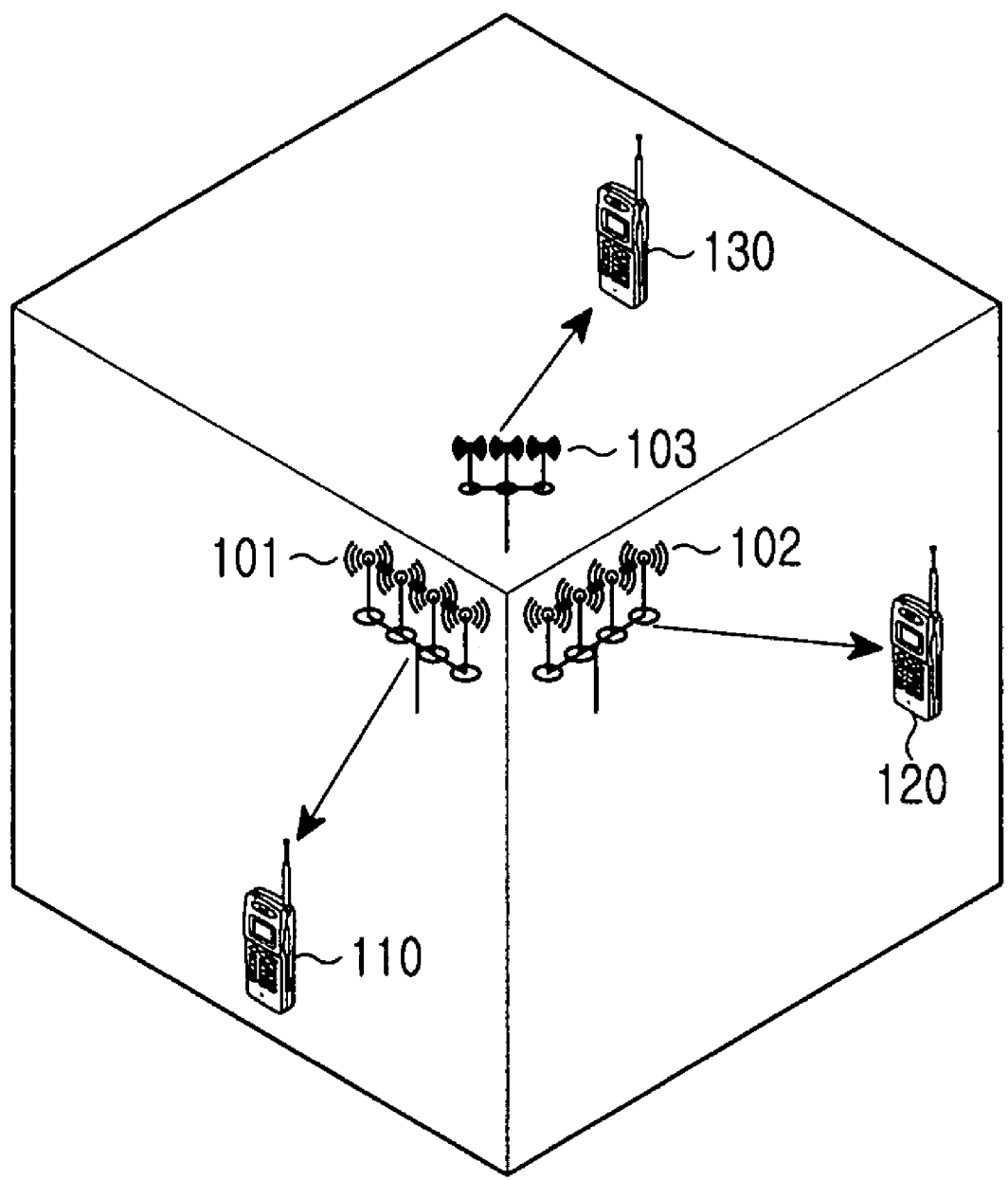
FIG. 1 illustrates conventional downlink beamforming (DL-BF) that does not consider interference cancellation.
Figure 2:
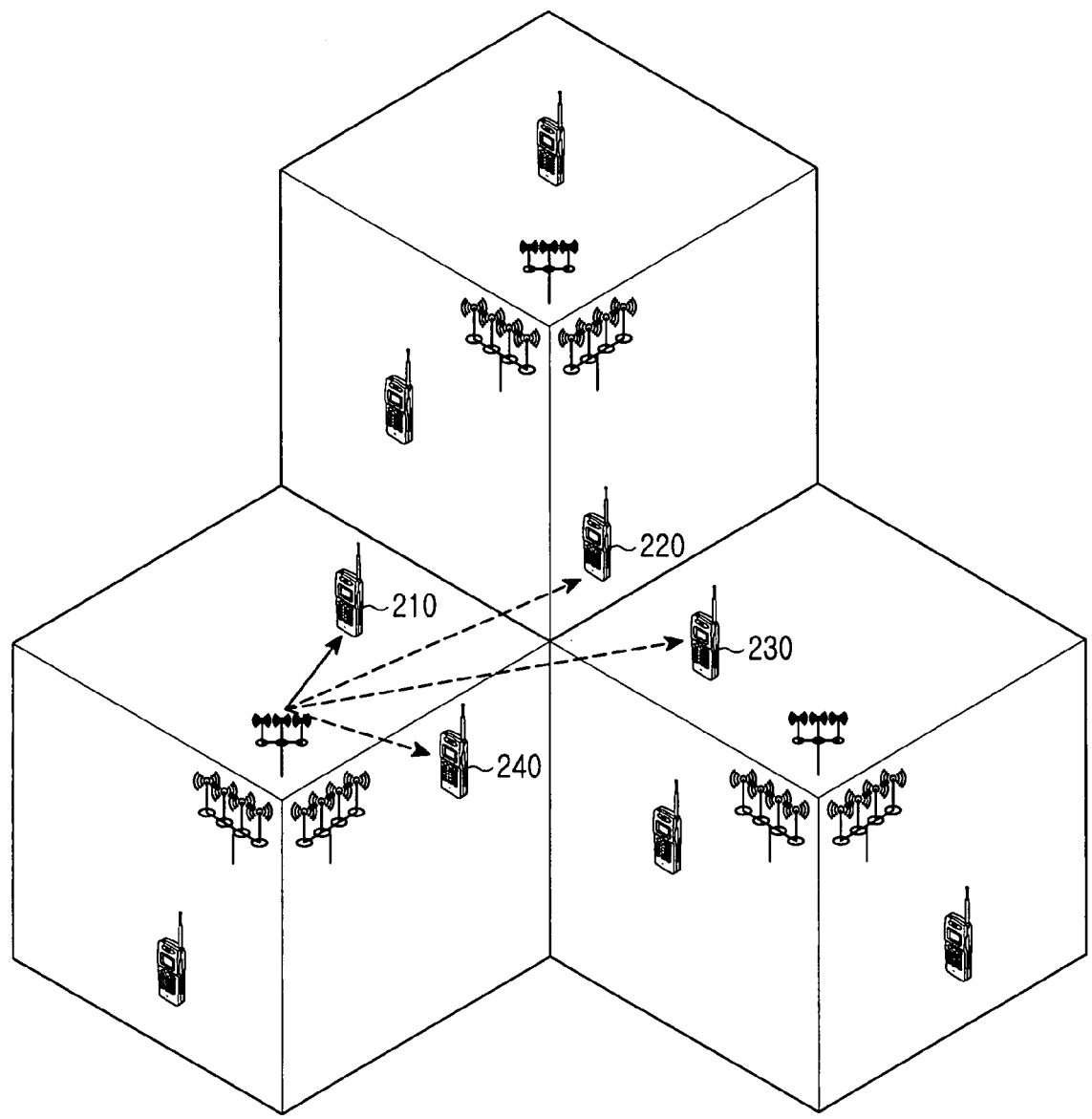
FIG. 2 illustrates the structure of a wireless mobile communication system to which the present invention is applied.

FIG. 2 illustrates the structure of a wireless mobile communication system to which the present invention is applied.

Referring to FIG. 2, a single cell is assumed to be divided into three (3) sectors. Each of the sectors has a frequency reuse factor of 1. Thus, mobile stations using the same frequency band may exist in neighboring sectors or cells. A base station in each sector allocates frequency resources to mobile stations in a way to avoid a collision between frequency bands in the same sector.

For example, a base station 201 includes four (4) transmission antennas and transmits a signal to a mobile station 210 in a particular frequency band. However, a signal destined to the mobile station 210 acts as an interference signal to other mobile stations 220, 230, and 240 using the same particular frequency band. Thus, the base station 201 has to apply different weight values to the transmission antennas such that the signal destined to the mobile station 210 is the maximum signal and the interference signal to the other mobile stations 220, 230, and 240 is the minimum signal. To this end, the present invention suggests a method for selecting a mobile station of a neighboring cell or sector, which may be affected by an interference signal. In the following description, selection of a mobile station to be interference-canceled will be called "mobile station selection."

Figure 3:
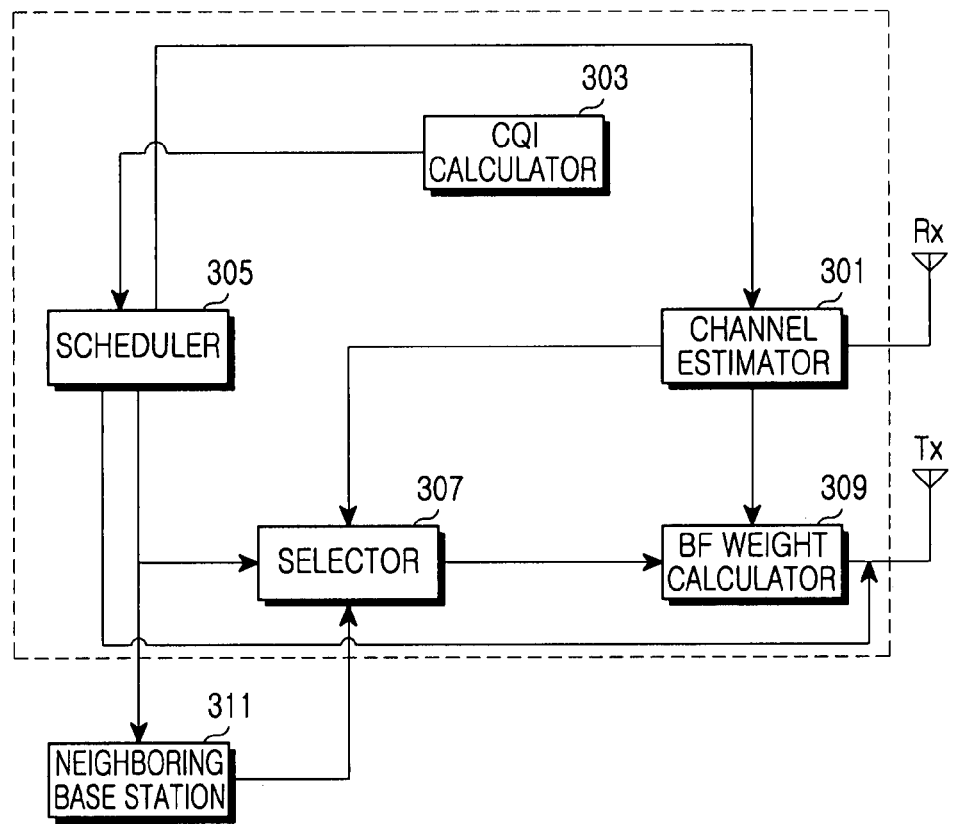
FIG. 3 is a block diagram of a DL-BF device of a base station according to an exemplary embodiment of the present invention.

FIG. 3 is a block diagram of a downlink beamforming (DL-BF) device of a base station according to an exemplary embodiment of the present invention.

Referring to FIG. 3, a channel estimator 301 of the base station receives a sounding sequence transmitted from a mobile station and performs uplink (UL) channel estimation. The sounding sequence is an orthogonal signal or a nearly orthogonal signal transmitted from the mobile station to the base station for channel estimation. Information associated with the sounding sequence (i.e., sounding sequence information) is exchanged over a backbone network between base stations. In other words, when a first base station uses a first sounding sequence and a second base station uses a second sounding sequence, sounding sequence information used by the first base station and sounding sequence information used by the second base station are exchanged over a backbone network between the first base station and the second base station. The channel estimator 301 performs uplink (UL) channel estimation using a pilot included in a signal transmitted from the mobile station.

A channel quality information (CQI) calculator 303 outputs a downlink (DL) CQI value. The DL CQI may be fed back to the base station from the mobile station and may be a signal-to-interference-and-noise Ratio (SINR) value. The CQI output from the CQI calculator 303 is input to a scheduler 305 and the scheduler 305 determines a data transmission priority based on a data transmission request from each mobile station, standby time from the reception of the data transmission request up to the current point of time, and the CQI. For priority determination, a fairness algorithm may be used. Based on the determined data transmission priority, the scheduler 305 selects a mobile station to which a sounding sequence transmission command is to be issued and transmits sounding sequence information related to the selected mobile station to a selector 307 and a neighboring base station 311. The scheduler 305 also transmits the sounding sequence information to the mobile station. It is preferable that sounding sequences used by mobile stations are orthogonal to one another.

The selector 307 receives channel information from the channel estimator 301, mobile station selection information from the scheduler 305, and mobile station selection information from the neighboring base station 311. The selector 307 selects a mobile station to be interference-canceled based on the received information. The detailed structure and operation of the selector 307 will be described in more detail with reference to FIGS. 4 through 6.

The beamforming (BF) weight calculator 309 determines a weight vector for each antenna using a channel matrix input from the selector 307 and transmits a signal to which the determined weight vector is applied. Determination of the weight vector falls outside the scope of the present invention, and thus will not be described in detail.

Hereinafter, the detailed structure of the selector 307 will be described in detail with reference to FIG. 4.

Figure 4:
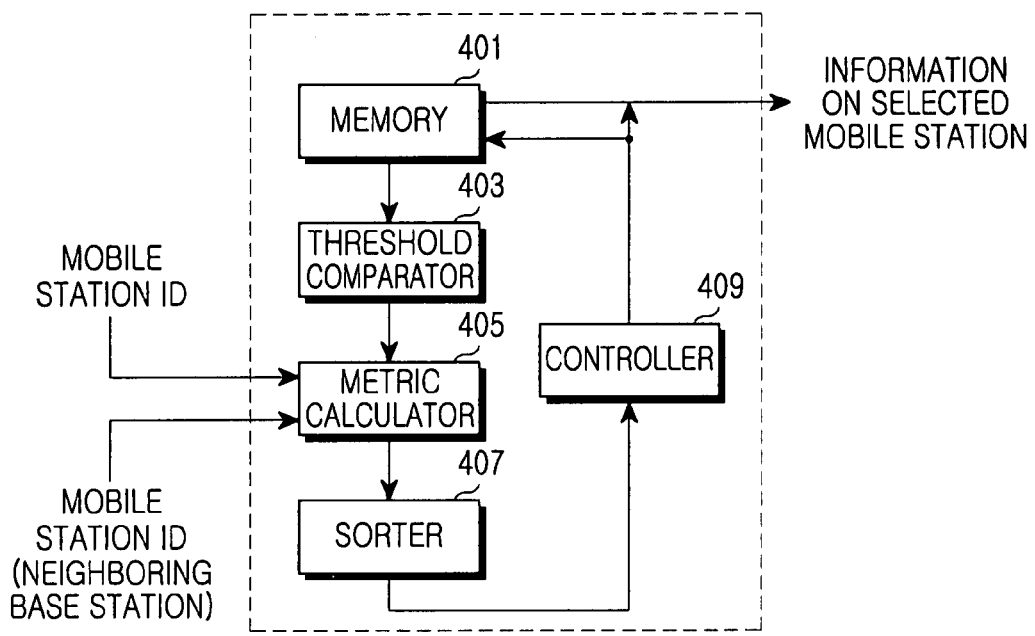
FIG. 4 is a detailed block diagram of a selector according to an exemplary embodiment of the present invention.

FIG. 4 is a detailed block diagram of the selector 307 according to an exemplary embodiment of the present invention.

Referring to FIG. 4, a memory 401 stores estimated channel information input from the channel estimator 301 of FIG. 3. A threshold comparator 403 determines an interference channel estimation value from the stored channel information and compares the determined interference channel estimation value with a preset threshold. If the interference channel estimation value is less than the threshold, interference cancellation is not performed. However, if the interference channel estimation value is greater than the threshold, interference cancellation has to be performed.

During determination of whether to perform interference cancellation, a metric calculator 405 calculates metric function values of interference channels using the following metric function:

$$f(h_k) = \left| h_k - \frac{h_1^H \cdot h_k}{\|h_1\|^2} h_1 \right|^2. \quad \text{[Eqn. 1]}$$

In Equation 1, $h_k$ indicates channel information of a mobile station k, and a superscript H indicates hermitian.

According to the present invention, when a base station having M multiple antennas transmits data corresponding to a stream to a mobile station having one reception antenna, (M−1) interference channels can be cancelled. If the number of interference channels is greater than (M−1), the base station has to select (M−1) interference channels from among the entire interference channels. Preferably, the selected interference channels are orthogonal or nearly orthogonal to the channel of the mobile station to which a signal is destined. If an interference channel that is similar to the channel of the mobile station is cancelled, the signal destined to the mobile station may undergo channel gain reduction due to interference cancellation. In other words, Equation 1 is a metric function expressing components of the interference channels that are orthogonal to the channel of the mobile station.

Thus, a sorter 407 sorts the interference channels that are orthogonal to the channel of the mobile station in descending order of the metric function values calculated using Equation 1, and selects (M−1) interference channels from among the sorted interference channels, as follows:

$$K = \underset{\{k \neq 1\}}{\operatorname{argmax}} f(h_k) \qquad [\text{Eqn. 2}]$$

Figure 7:
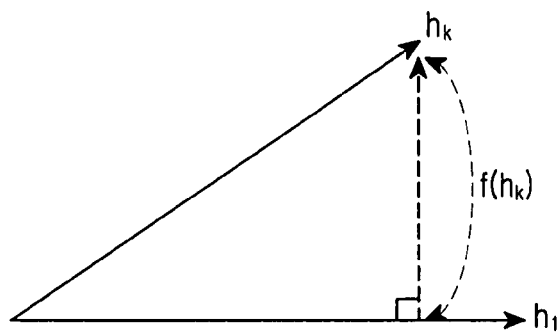
FIG. 7 is a diagram illustrating determination of a metric function value according to an exemplary embodiment of the present invention.

The components of the interference channels that are orthogonal to the channel of the mobile station can be acquired by projecting the channel of the mobile station to the interference channels and removing the projected components from the interference channels, as illustrated in FIG. 7.

Once the (M−1) interference channels are completely selected, a controller 409 performs a control operation to output mobile station information corresponding to the selected interference channels.

Figure 5:
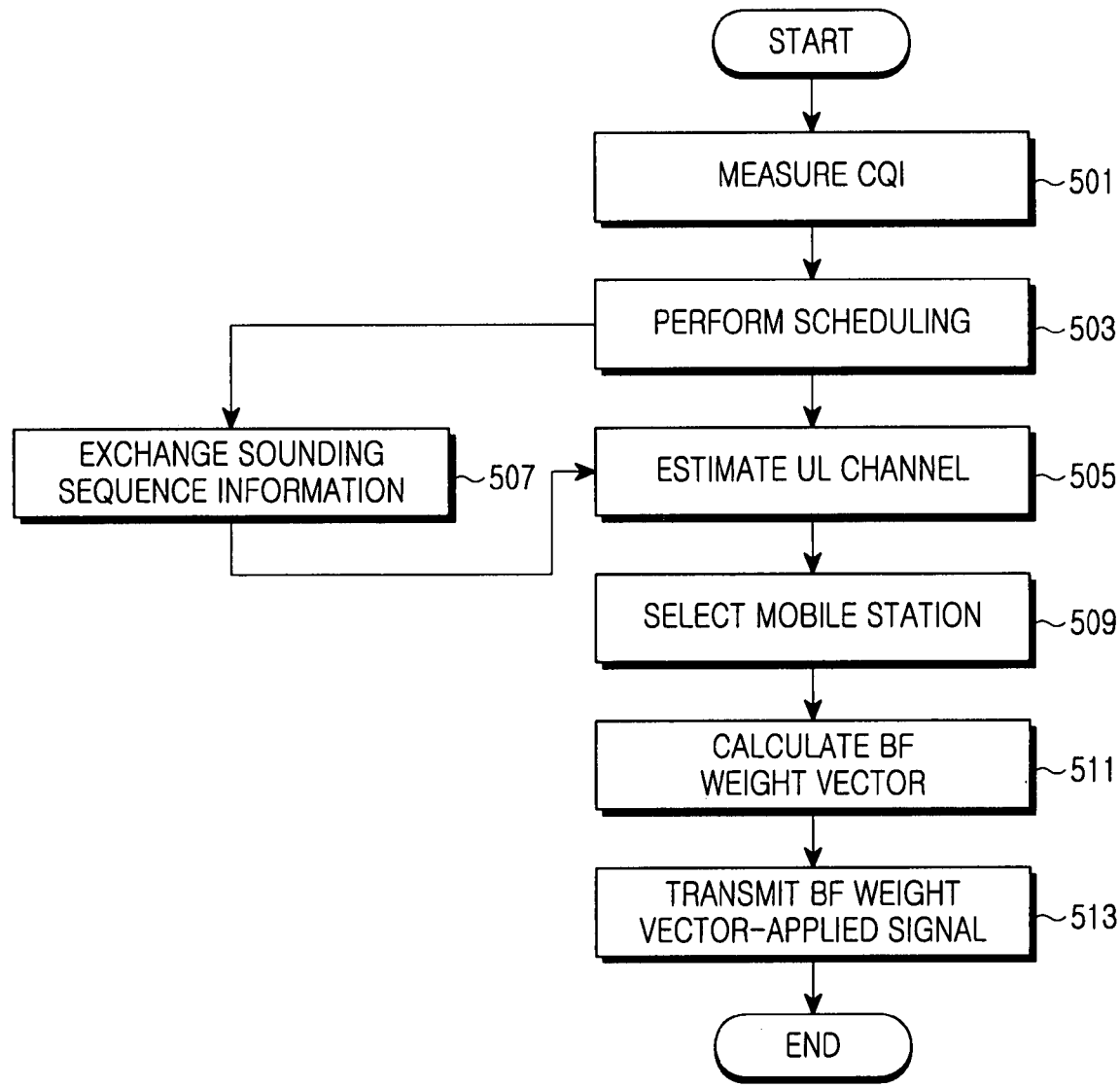
FIG. 5 is a flowchart illustrating a DL-BF process performed by a base station according to an exemplary embodiment of the present invention.

FIG. 5 is a flowchart illustrating a downlink beamforming (DL-BF) process performed by a base station according to an exemplary embodiment of the present invention.

Referring to FIG. 5, the base station measures a CQI for a DL channel of a mobile station in step 501. The CQI may be, for example, an SINR and channel information fed back by the mobile station. In step 503, the base station performs scheduling that involves selecting a mobile station to which data is to be transmitted at a corresponding point of time. In step 507, the base station exchanges sounding sequence information for each mobile station with a neighboring base station and uses the sounding sequence information received from the neighboring base station for UL channel estimation of step 505.

In step 509, the base station selects an interference channel that is to be cancelled (i.e., a mobile station to be interference-canceled).

In step 511, the base station calculates a BF weight vector that causes the signal destined to a mobile station located in its cell or sector to be the maximum signal and causes an interference signal to a mobile station located in a neighboring cell or sector to be the minimum signal. In step 513, the base station applies the calculated BF weight vector to the transmission signal and transmits the weight vector applied signal. The BF weight vector may vary according to transmission antennas.

Figure 6:
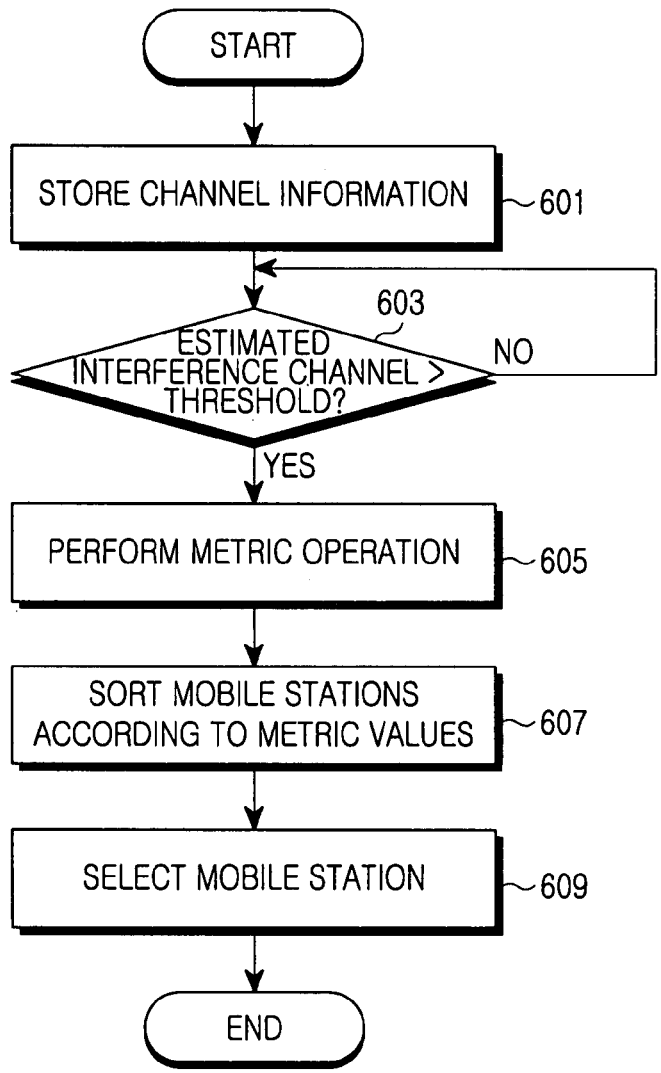
FIG. 6 is a flowchart illustrating a process in which a base station selects a mobile station to be interference-canceled according to an exemplary embodiment of the present invention.

FIG. 6 is a flowchart illustrating a process in which a base station selects a mobile station to be interference-canceled according to an exemplary embodiment of the present invention.

Referring to FIG. 6, the base station stores channel information determined using channel feedback information or sounding sequence information transmitted from a mobile station in step 601. The base station calculates an interference channel estimation value for each interference channel affecting its cell or sector in step 603. The base station compares the calculated interference channel estimation value with a preset threshold in step 603. If the calculated interference channel estimation value is greater than the threshold, the process goes to step 605 in order to perform interference cancellation.

In step 605, the base station performs a metric operation for each interference channel using Equation 1.

In step 607, the base station sorts mobile stations in descending order of metric function values calculated by the metric operation (i.e., in descending order of calculated interference channel estimation values). In step 609, the base station selects a mobile station causing interference from a neighboring cell or sector. In the signal transmitted from the base station to the selected mobile station, an interference component can be minimized by application of a BF weight vector.

As is apparent from the foregoing description, according to the present invention, in a wireless mobile communication system having a multi-cell (or multi-sector) structure, a base station determines a mobile station of a neighboring cell or sector from which an interference signal is to be cancelled and applies a DL weight vector capable of minimizing an interference component to a signal destined to the determined mobile station. Therefore, an interference component of the signal destined to the neighboring cell or sector can be minimized, leading to improvement of signal reception performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for canceling interference by a base station in a wireless mobile communication system, the method comprising:

measuring a state of a channel with a mobile station;

determining metric function values for interference channels that act as interference to the channel of the mobile station;

selecting a predetermined number of interference channels in descending order of the metric function values;

determining a weight vector for removing a signal transmitted over the interference channels; and applying the determined weight vector to a transmission signal and transmitting the weight vector applied signal.

2. The method of claim 1, wherein the metric function values for the interference channels are determined using:

$$f(h_k) = \left| h_k - \frac{h_1^H \cdot h_k}{\|h_1\|^2} h_1 \right|^2,$$

where $h_k$ indicates channel information of a mobile station k, a superscript H indicates hermitian, and $h_1$ indicates channel information of the mobile station.

3. The method of claim 1, wherein the state of the channel is measured using a sounding sequence transmitted by the mobile station.

4. The method of claim 1, wherein the predetermined number is equal to or less than a result of subtracting 1 from the number of transmission antennas of the base station.

5. The method of claim 4, wherein the predetermined number is equal to the number of selected interference channels if the number of selected interference channels is less than the result of subtracting 1 from the number of transmission antennas.

6. An apparatus for selecting interference channels for a base station in a wireless mobile communication system, the apparatus comprising:

a threshold comparator for comparing an interference channel estimation value determined using information about a state of a channel with a mobile station with a preset threshold;

a metric calculator for determining metric function values for interference channels; and a sorter for sorting the interference channels in descending order of the metric function values calculated by the metric calculator and then selecting a predetermined number of interference channels.

7. The apparatus of claim 6, wherein the metric function values are determined using:

$$f(h_k) = \left| h_k - \frac{h_1^H \cdot h_k}{\|h_1\|^2} h_1 \right|^2,$$

where $h_k$ indicates channel information of a mobile station k, a superscript H indicates hermitian, and $h_1$ indicates channel information of the mobile station.

8. The apparatus of claim 6, wherein the predetermined number is equal to or less than a result of subtracting 1 from the number of transmission antennas of the base station.

9. The apparatus of claim 8, wherein the predetermined number is equal to the number of selected interference channels if the number of selected interference channels is less than the result of subtracting 1 from the number of transmission antennas.

10. The apparatus of claim 6, further comprising a controller for performing a control operation to output mobile station information corresponding to the selected interference channels upon selection of the predetermined number of interference channels.

11. A wireless communication system comprising:

a plurality of base stations capable of communicating with a plurality of mobile stations accessing the wireless communication system; and at least one apparatus associated with at least one of the plurality of base stations for selecting interference channels for the at least one base station, the apparatus comprising:

a threshold comparator for comparing an interference channel estimation value determined using information about a state of a channel with a mobile station with a preset threshold;

a metric calculator for determining metric function values for interference channels; and a sorter for sorting the interference channels in descending order of the metric function values calculated by the metric calculator and then selecting a predetermined number of interference channels.

12. The wireless communication system of claim 11, wherein the metric function values are determined using:

$$f(h_k) = \left| h_k - \frac{h_1^H \cdot h_k}{\|h_1\|^2} h_1 \right|^2,$$

where $h_k$ indicates channel information of a mobile station k, a superscript H indicates hermitian, and $h_1$ indicates channel information of the mobile station.

13. The wireless communication system of claim 11, wherein the predetermined number is equal to or less than a result of subtracting 1 from the number of transmission antennas of the base station.

14. The wireless communication system of claim 13, wherein the predetermined number is equal to the number of selected interference channels if the number of selected interference channels is less than the result of subtracting 1 from the number of transmission antennas.

15. The wireless communication system of claim 11, further comprising a controller for performing a control operation to output mobile station information corresponding to the selected interference channels upon selection of the predetermined number of interference channels.

\* \* \* \* \*